Dec. 20, 1938.　　　R. M. ROOKE ET AL　　　2,141,021

METHOD OF WELDING

Filed Dec. 9, 1936

INVENTORS
Robert M. Rooke and
Frederick C. Saacke
BY
ATTORNEY

Patented Dec. 20, 1938

2,141,021

UNITED STATES PATENT OFFICE 2,141,021

METHOD OF WELDING

Robert M. Rooke, Jersey City, N. J., and Frederick C. Saacke, New York, N. Y., assignors to Air Reduction Company, Incorporated, New York, N. Y., a corporation of New York Application December 9, 1936, Serial No. 114,936

2 Claims. (Cl. 113—112)

This invention relates to fusion welding of heavy or relatively heavy metal parts by means of the oxyacetylene or equivalent oxy-fuel gas flame, and a welding rod from which metal is melted into the V or other form of welding space provided by appropriate shaping of the edges of the parts to be united.

The object of the invention is to make sounder and more ductile welds, to overcome many difficulties in these welding operations, to make it easy for operators, though not highly skilled, to produce excellent welds, and to reduce the time and the cost in gas and filling material required to make a given weld.

The invention is a novel process of multi-layer gas flame fusion welding.

The deposition of weld metal in more than one layer is the general practice in electric fusion welding, for reasons inherent in that process. Multi-layer welding was a necessity with electric welding since the limitations of the process prevented the carrying of as large a puddle of clean metal as could be carried in gas welding. Furthermore, the temperature of the electric arc was so high that the necessity for preheating, as with gas welding, was not present. It was probably this necessity for preheating that was the cause of the assumption in oxyacetylene welding that to bring any part to be joined up to a welding temperature more than once would make the operation slow and uneconomical.

In the past multi-layer welding has been recommended and used in the field of oxyacetylene welding, but not in a desirable manner. It was readily recognized that with parent metal thicknesses over ¾ inch or even ½ inch it would be easier to make the weld in more than one layer; but it was not realized how important the length of the layers might be in securing the ultimate in physical characteristics of the weld metal. Thus, previous multi-layer gas welding was practiced with the layers alternating in short steps of approximately one inch in length, which did not allow the lower layers sufficient time to cool below the critical temperature range of the steel before covering with further layers of weld metal.

In accordance with this invention gas-welded layers of filling metal are deposited in steps or passes that must be long enough to permit the cast metal of a lower layer to solidify and cool below the critical temperature range before the superincumbent layer is deposited. By the added deposit, under the intense heat of the gas flame, the metal of the lower layer is re-heated and slightly re-melted, with the result that not merely are the layers fused with each other and with the parent metal, but that the structure of the unmelted weld metal is partially or wholly refined and made more ductile, depending upon the penetration of the welding heat.

A form of execution of the method that has given particularly satisfactory results is one in which layers are deposited in long steps, for example, steps 2 to 12 inches, but preferably 6 inches, in length on 8 inch pipe. The number of layers may vary depending upon the thickness of the parent metal and other considerations. For ½ inch metal two layers may be sufficient. For ¾ inch metal three layers are better. The weld metal may be applied in a greater number of layers.

In order to conserve heat and economize gas it is particularly contemplated that layers be deposited in alternating steps. Thus, a sealing layer is fused into the lower part of the V or other troughed welding space between the parent metal parts, and the deposit of this layer is continued for a length sufficient to permit the metal of the layer, or at least the initial part of it, to cool through the critical range. Then the torch and welding rod are returned to near the starting point of the first layer step, and another layer is deposited on top. When the end of the first layer step is reached, the operation with torch and rod is continued so as to form another bottom layer step in the bottom of the trough. When this second bottom layer step is long enough for the requisite cooling to have taken place, the torch and rod are returned to the end of the upper layer step, another step of the upper layer is deposited, and then in continuation another bottom layer step is formed. These operations are repeated around the circumference of the pipe, or throughout the length of a rectilinear seam. If the metal is not too thick the alternating two-layer steps may complete the weld. In many instances, however, it is highly advantageous to complete the weld by depositing a top layer in a continuous pass, the deposit of this layer serving to refine the large body of weld metal constituting the second or intermediate layer. Naturally, a weld may be made with more than two layers in steps, followed by a final finishing layer in continuous pass.

With less economy, advantages in grain refinement may be realized by making the weld in multiple continuous passes.

In the accompanying drawing forming part hereof and showing a preferred, illustrative form of the invention:

Figure 1:
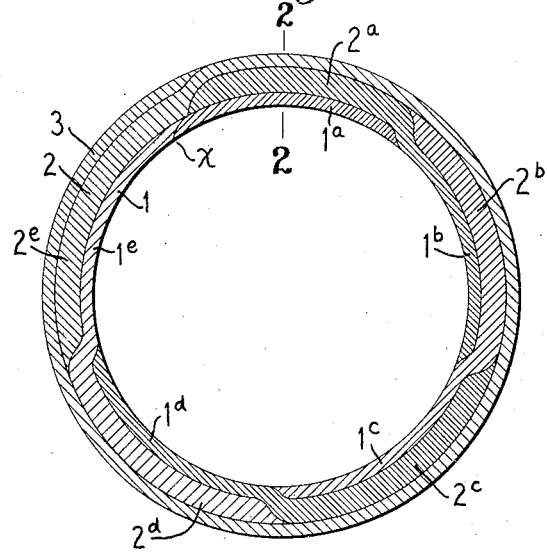
Fig. 1 is a section in the central plane of a girth pipe weld made in accordance with the invention.
Figure 2:
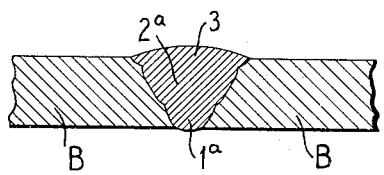
Fig. 2 is a section on the line 2—2 of Fig. 1.
Figure 3:
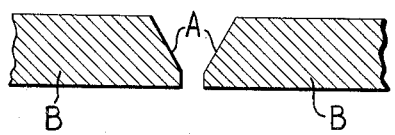
Fig. 3 is a section showing the welding space between the parent metal parts.

It will be understood that the layers become fused together in one body of weld metal. In order to illustrate the invention they are shown in Fig. 1 with definite demarcations.

The invention is illustrated in connection with the welding together of the ends of pipe sections. The operation may be carried out either as a rolling weld (pipe turned as desired) or as a position weld (pipe not turned).

The thin-edged, narrowly spaced lower portion of the welding space A between the edges or ends of the parent metal parts B, B is sealed with a layer of metal $1^a$ melted by the flame from a welding rod. The starting point is at X. This layer step is prolonged until the deposited metal has given up enough heat to bring it below the critical temperature. Then a layer $2^a$ is deposited on top of the layer $1^a$. When each layer is deposited care is taken to fuse it with the parent metal and with any layer beneath. When layer $2^a$ reaches the end of step layer $1^a$, the operation is continued along the bottom of the V until another bottom layer step $1^b$ of the requisite length has been formed. Then, operation is resumed at the end of layer $2^a$, another upper layer $2^b$ is deposited on top of layer $1^b$, and this deposit is continued with torch and rod to form another bottom layer step $1^c$. These operations are repeated to form layer steps $2^c$, $1^d$, $2^d$, $1^e$ and $2^e$, until the circuit of the pipe or the end of the seam has been reached. Then a finishing layer 3 is applied in continuous pass, this finishing layer being preferably in continuation with the last step $2^e$ of the second layer. The start of layer step $2^a$ should be past the start of layer step $1^a$ so that layers 1 and 2 (steps $1^e$ and $2^e$) are completed against a slope.

Modifications of this procedure will be understood by those skilled in the art.

We claim:

1. The method of uniting metal parts by means of a gas flame and welding rod, which method comprises welding together juxtaposed edges of said parts progressively along a seam formed between said edges for a distance sufficient to permit the initially melted metal to cool through its critical temperature range, then melting additional metal into the seam and depositing such metal progressively along the seam over the initially melted metal after it has cooled through its critical temperature range, continuing the deposit of metal progressively along the seam beyond the end of the initial portion of the weld for a distance substantially equal in length to said initial portion, and then progressively melting additional metal into the seam above and beyond the second portion of the weld after it cools through its critical temperature range, and similarly adding successive portions to the weld until the seam has been welded for its full length.

2. The method of welding parent metal parts, previously formed to provide a welding space, by means of a welding rod and an oxy-fuel gas welding flame which fuses the parent metal and the metal added from the rod, which method comprises depositing the added metal in multiple layers in successive steps of a substantially continuous process, and making each layer of such length that a lower layer is given time to cool through its critical temperature range before another layer is deposited upon it, the method being further characterized in that two or more of the layers are deposited in alternating upper and lower steps.

ROBERT M. ROOKE.
FREDERICK C. SAACKE.